US008408292B2

(12) United States Patent
Alsop et al.

(10) Patent No.: US 8,408,292 B2
(45) Date of Patent: *Apr. 2, 2013

(54) METHOD FOR PRE-TREATMENT OF SUBTERRANEAN SITES ADJACENT TO WATER INJECTION WELLS

(75) Inventors: Albert W. Alsop, Wilmington, DE (US); Robert D. Fallon, Elkton, MD (US); Scott Christopher Jackson, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 304 days.

This patent is subject to a terminal disclaimer.

(21) Appl. No.: 12/833,043

(22) Filed: Jul. 9, 2010

(65) Prior Publication Data

US 2012/0006537 A1    Jan. 12, 2012

(51) Int. Cl.
*E21B 43/16* (2006.01)
*E21B 43/26* (2006.01)

(52) U.S. Cl. .................. 166/246; 166/305.1; 166/307

(58) Field of Classification Search .................. None
See application file for complete search history.

(56) References Cited

U.S. PATENT DOCUMENTS

| 4,165,785 | A | 8/1979 | Schievelbein |
| 5,265,674 | A * | 11/1993 | Fredrickson et al. ......... 166/246 |
| 5,300,235 | A | 4/1994 | Clewlow et al. |
| 5,756,304 | A | 5/1998 | Jovanovich |
| 6,984,610 | B2 | 1/2006 | VonKrosigk et al. |
| 7,484,560 | B2 | 2/2009 | Lal et al. |
| 7,776,795 | B2 * | 8/2010 | Keeler et al. .................. 507/201 |
| 2006/0013798 | A1 | 1/2006 | Henry et al. |
| 2009/0071653 | A1 | 3/2009 | Hodge |
| 2009/0211755 | A1 | 8/2009 | Dyer et al. |
| 2009/0263887 | A1 * | 10/2009 | Keeler et al. ............... 435/253.3 |
| 2010/0081585 | A1 * | 4/2010 | Fallon .......................... 507/201 |
| 2011/0030956 | A1 * | 2/2011 | Choban et al. ............. 166/305.1 |

FOREIGN PATENT DOCUMENTS

WO    2008070990    6/2008

OTHER PUBLICATIONS

Chang, Corrosion Inhibitors, 2006 Specialty Chemicals, SRI Consulting, pp. 7-149.
Carolet, Petroleum Microbiology, "Microbial Corrosion in the Oil Industry: A Corrosionist's View", Chapter 8, pp. 164-165, Edited by Ollivier and Magot, 2005, ASM Press, Washington, DC.
Dean, Lange's Handbook of Chemistry, 14$^{th}$ Edition, pp. 8.14, 8.15 & 8.19, McGraw-Hill, Inc., NY (1992).
Labeda, Isolation of Biotechnological Organisms from Nature, pp. 117-140, McGraw-Hill Publishers (1990).
Schwermer et al., "Impact of Nitrate on the Structure and Function of Bacterial Biofilm Communitites in Pipelines Used for Injection of Seawater into Oil Fields" Appl. Environ. Microbiol., 74(9), pp. 2841-2851 (2008).
Sanders et al., "Biofouling in the oil industry", Chapter 9, p. 191, in: Ollivier B. et a., Petroleum Microbiology, 2005 ASM Press, Washington, DC.
Demain et al., Manual of Industrial Microbiology and Biotechnology, Sections I and II, ASM Press, Washington, DC 1986, pp. 3-136.

* cited by examiner

*Primary Examiner* — Angela M DiTrani

(74) *Attorney, Agent, or Firm* — Scully, Scott, Murphy & Presser, P.C.

(57) ABSTRACT

A method to improve the effectiveness of MEOR or bioremediation processes. In this method toxic chemicals accumulated in subterranean sites adjacent to the water injection wells are either dispersed or removed prior to introduction of microbial inocula for enhanced microbial oil recovery or bioremediation of these sites.

7 Claims, 6 Drawing Sheets

METHOD FOR PRE-TREATMENT OF SUBTERRANEAN SITES ADJACENT TO WATER INJECTION WELLS

FIELD OF THE INVENTION

The invention relates to the field of microbial enhanced oil recovery and bioremediation of subterranean contaminated sites. Specifically, it relates to methods of treating the toxic chemicals accumulated in subterranean sites adjacent to the water injection wells prior to introduction of microbial inocula for microbial enhanced oil recovery or bioremediation of these sites.

BACKGROUND OF THE INVENTION

Traditional oil recovery techniques which utilize only the natural forces present at an oil well site, allow recovery of only a minor portion of the crude oil present in an oil reservoir. Oil well site generally refers to any location where wells have been drilled into a subterranean rock containing oil with the intent to produce oil from that subterranean rock. An oil reservoir typically refers to a deposit of subterranean oil. Supplemental recovery methods such as water flooding have been used to force oil through the subterranean location toward the production well and thus improve recovery of the crude oil (Hyne, N.J., 2001, "Non-technical guide to petroleum geology, exploration, drilling, and production", 2nd edition, Pen Well Corp., Tulsa, Okla., USA).

To meet the rising global demand on energy, there is a need to further increase production of crude oil from oil reservoirs. An additional supplemental technique used for enhancing oil recovery from oil reservoirs is known as Microbial Enhanced Oil Recovery (MEOR) as described in U.S. Pat. No. 7,484,560. MEOR, which has the potential to be a cost-effective method for enhanced oil recovery, involves either stimulating the indigenous oil reservoir microorganisms or injecting specifically selected microorganisms into the oil reservoir to produce metabolic effects that lead to improved oil recovery.

The production of oil and gas from subterranean oil reservoirs requires installing various equipment and pipelines on the surface or the subterranean sites of the oil reservoir which come in contact with corrosive fluids in gas- and oil-field applications. Thus, oil recovery is facilitated by preserving the integrity of the equipment needed to provide water for water injection wells and to convey oil and water from the production wells. As a result, corrosion can be a significant problem in the petroleum industry because of the cost and downtime associated with replacement of corroded equipment.

Sulfate reducing bacteria (SRB) microorganisms, which produce hydrogen sulfide ($H_2S$), are amongst the major contributors to corrosion of ferrous metal surfaces and oil recovery equipment. These microorganisms can cause souring, corrosion and plugging and thus can have negative impact on a MEOR or a bioremediation process. Bioremediation refers to processes that use microorganisms to cleanup oil spills or other contaminants from either the surface or the subterranean sites of soil.

To combat corrosion, corrosion inhibitors which are chemicals or agents that decrease the corrosion rate of a metal or an alloy and are often toxic to microorganisms, are used to preserve the water injection and oil recovery equipment in such wells. In the practice of the present invention a water injection well is a well through which water is pumped down into an oil producing reservoir for pressure maintenance, water flooding, or enhanced oil recovery. The significant classes of corrosion inhibitors include compounds such as: inorganic and organic corrosion inhibitors. For example, organic phosphonates, organic nitrogen compounds, organic acids and their salts and esters (Chang, R. J. et al., Corrosion Inhibitors, 2006, Specialty Chemicals, SRI Consulting).

US2006/0013798 describes using bis-quaternary ammonium salts as corrosion inhibitors to preserve metal surfaces in contact with the fluids to extend the life of these capital assets.

U.S. Pat. No. 6,984,610 describes methods to clean up oil sludge and drilling mud residues from well cuttings, surface oil well drilling and production equipment through application of acids, pressure fracturing and acid-based microemulation for enhanced oil recovery.

WO2008/070990 describes preconditioning of oil wells using preconditioning agents such as methyl ethyl ketone, methyl propyl ketone and methyl tertiary-butyl ether in the injection water to improve oil recovery. Mechanisms such as modifying the viscosity of the oil in the reservoir and enlivening the heavy oil were attributed to this method.

US2009/0071653 describes using surfactants, caustic agents, anti-caking agents and abrasive agents to prevent or remove the build-up of fluid films on the processing equipment to increase the well's capacity.

Studies indicate that long-term addition of chemicals or agents used to control undesirable events such as corrosion, scale, microbial activities, and foam formation in the water supply of a water injection well does not lead to their accumulation in high enough concentrations to adversely affect the microorganisms used in MEOR (Carolet, J-L. in: Ollivier and Magot ed., "Petroleum Microbiology", chapter 8, pages 164-165, 2005, ASM press, Washington, D.C.).

However, viability of microorganisms used in MEOR or bioremediation processes is a concern. It can be desirable to modify MEOR or bioremediation treatments such that the viability of microorganisms used is maintained throughout the process thus making them more effective.

SUMMARY OF THE INVENTION

The present disclosure relates to a method for improving the effectiveness of a MEOR or bioremediation process by detoxifying subterranean sites adjacent to oil wells, wherein the wells have been previously treated with corrosion inhibitors prior to inoculation of the microorganisms required for MEOR or bioremediation.

In one aspect, the present invention is an oil recovery method comprising the steps of:
 a) treating a subterranean site in a zone adjacent to a water injection well with a detoxifying agent wherein, prior to the treatment, corrosion inhibitors and their degradation products have been adsorbed into the zone and have accumulated to concentrations that are toxic to microorganisms used in microbial enhanced oil recovery and/or bioremediation processes, and thereby have formed a toxic zone; and
 b) adding an inoculum of microorganisms for microbial enhanced oil recovery to the water injection well wherein the inoculum of microorganisms comprises *Shewanella putrefaciens* (ATCC PTA-8822);
 wherein the corrosion inhibitor is an inorganic compound selected from the group consisting of chlorine, hypochlorite, bromine, hypobromide, chlorine dioxide, hydrazine, anthraquinone, phosphates, and salts containing chrome, molybdenum, zinc, nitrates, nitrites and sodium sulfite.

DETAILED DESCRIPTION OF THE INVENTION

In one aspect, the present invention is a method for detoxifying the corrosion inhibitors and their degradation products in a subterranean site adjacent to a water injection well of an oil well site. Applicants have found that oil recovery processing aids—such as corrosion inhibitors, for example—can accumulate in the area adjacent to the water injection well and build to concentrations that are toxic to microorganisms used in MEOR or bioremediation. As the term is used herein, "detoxifying" or "detoxification of" a water injection site means removing or reducing the toxicity caused by corrosion inhibitors and their degradation products to microorganisms to allow their growth and activity of said microorganisms, used in MEOR or bioremediation.

For the purposes of the present invention, the term "toxic zone" refers to a subterranean site adjacent to the water injection well comprising toxic concentrations of agents such as corrosion inhibitors or their degraded products which have adverse effects on growth and metabolic activities of microorganisms used in MEOR and/or bioremediation. A toxic agent, as the term is used herein, is any chemical or biological agent that adversely affects growth and metabolic functions of microorganisms used in MEOR and/or bioremediation.

Figure 1:
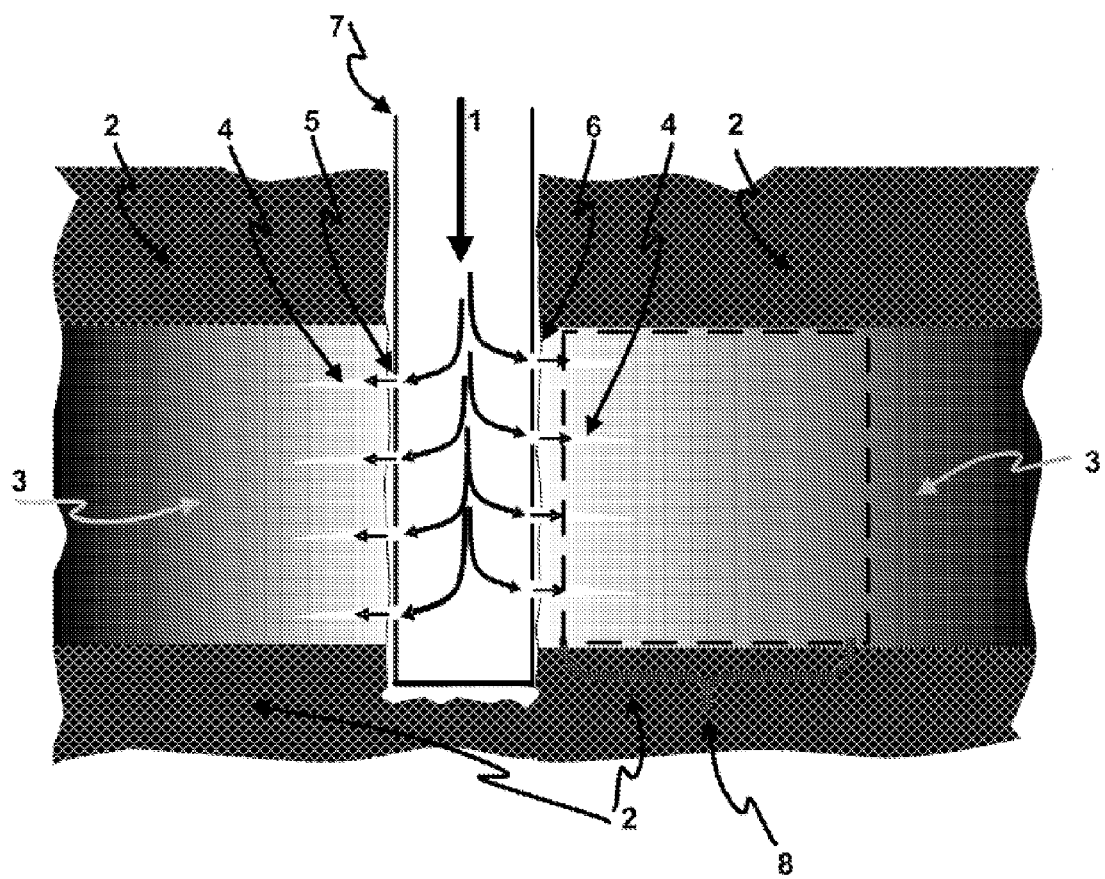
FIG. 1 is the schematic representation of a water injection well and the subterranean sites adjacent to the water injection well. (1) is the flow of injection water into the well casing (7), (2 and 3) are rock layers, (4) is the perforations in the casing, (5) is the well bore, (6) is the face of the rock layer made by the well bore, (7) is the well casing, (8) is one side of the watered zone that is axi-symmetric with the injection well, shown by a dotted box in the rock layer (3).

FIG. 1 is a schematic of a subterranean site adjacent to a water injection well. The injection water (1) flows into the well casing (7) which is inside the well bore (5) drilled through rock layers (2 and 3). A gap exists between the well casing (7) and the face (6) of the rock layer made by the well bore (5). Rock layer (2) represents impermeable rock above and below a permeable rock (3) that holds or traps the oil. The injection water (1) flows down the well casing (7) and passes through perforations in the casing (5) and into fractures (4) in the permeable rock (3). This injection water then flows through the permeable rock layer (3) and displaces oil from a watered zone (8) adjacent to the well bore. This zone extends radially out from the well bore (5) in all directions in the permeable rock layer (3). While the volume of permeable rock (3) encompassed by the dash line (8) is illustrated only on one side of the well bore it actually exists on all sides of the well bore. This watered zone represents the subterranean site adjacent to the water injection well.

Corrosion inhibitors that can accumulate to levels that are toxic to microorganisms used in MEOR are, for example: inorganic corrosion inhibitors such as chlorine, hypochlorite, bromine, hypobromide and chlorine dioxide. Those used to combat corrosion caused by SRB microorganisms include, but are not limited to: nitrates (e.g., calcium or sodium salts), nitrite, molybdate, (or a combination of nitrate, nitrite and molybdate), anthraquinone, phosphates, salts containing chrome and zinc and other inorganics, including hydrazine and sodium sulfite (Sanders and Sturman, chapter 9, page 191, in: "Petroleum microbiology" page 191, supra and Schwermer, C. U., et al., Appl. Environ. Microbiol., 74: 2841-2851, 2008).

Organic compounds used as corrosion inhibitors include: acetylenic alcohols, organic azoles, gluteraldehyde, tetrahydroxymethyl phophonium sulfate (THPS), bisthiocyanate acrolein, dodecylguanine hydrochloride, formaldehyde, chlorophenols, organic oxygen scavengers and various nonionic surfactants.

Other organic corrosion inhibitors include, but are not limited to: organic phosphonates, organic nitrogen compounds including primary, secondary, tertiary or quaternary ammonium compounds (hereinafter referred to generically as "amines"), organic acids and their salts and esters, carboxylic acids and their salts and esters, sulfonic acids and their salts.

Applicants have determined that corrosion inhibitors can accumulate by adsorption into or on the subterranean site (e.g., sand stone, unconsolidated sand or limestone) or into the oil that has been trapped in the oil reservoir subterranean site. Long-term addition of these chemicals results in their accumulation and formation of a toxic zone in subterranean sites adjacent to the water well with adverse effects on microbial inocula intended for MEOR and/or bioremediation applications.

A model system to simulate formation of a toxic zone can be used to study its effects on the survival of microorganisms. For example, a model system called a slim tube can be set up and packed with core sand from an oil well site. The model system as described herein can be set up using tubing, valves and fittings compatible with the crude oil or the hydraulic solution used that can withstand the range of applied pressure during the process. An absolute pressure transducer, differential pressure transducer and back pressure regulator for Example made by (Cole Plamer, Vernon hill, IL and Serta, Boxborough, Mass.) are required and are commercially available to those skilled in the art.

The model toxic zone can be established using solutions of amines and/or amine mixtures and flushing them through a tube packed with core sand from an oil reservoir. Other corrosion inhibitors suitable for use in constructing a model can comprise organic phosphonates or anthraquinone or phosphates. The concentration of the corrosion inhibitors used to create the model toxic zone may be from 0.01 to 100 parts per million.

Detoxification of the toxic zone involves degradation, desorption or dispersion of the accumulated toxic chemicals or agents using detoxifying agents. The term "detoxifying agent" therefore refers to any chemical that either disperses or destroys the toxic chemicals and agents described herein and renders them non-toxic to microorganisms.

Detoxification of the chemicals accumulated in the toxic zone may be achieved using a degradation agent. A degradation agent, as the term is used herein, is an agent that destroys or assists in the destruction of toxic agents found in the toxic zone. Degradation agents can include, for example, strong oxidizers that chemically react with corrosion inhibitors when added to the injection water and degrade them into less toxic or non-toxic products. Degradation agents include strong oxidizing agents such as, for example, nitrates, nitrites, chlorates, percholorates and chlorites.

Detoxification of the chemicals accumulated at the toxic zone may also be achieved using a dispersing agent. A "dispersing agent" as the term is used herein includes any chemical that lowers the pH of the solution, ionizes the amines and solubilizes them into the water during water flooding and allows for natural dispersion and diffusion to lower the concentration where it is no longer toxic to MEOR or bioremediation microorganisms. For example, amines are fairly nonreactive under mild conditions, however, they become ionized at lower pH. Thus treatment of the amines with an acid increases their solubility and releases them from oil and/or from rocks and disperses them from the toxic zone. The solubilized amines may therefore enter into the water flowing through the well. A combination of radial flow, dispersion and desorption may allow the solubilized amines to be diluted and dispersed over a large area (from at least 10 to about 200 feet (from at least 3 meters to about 7 meters)) of the oil well. Following dilution and dispersion of the amines over a much larger area, their concentrations within the subterranean site of the well would have been consequently reduced to non-toxic levels for MEOR or bioremediation microorganisms. However, even if the amines concentrations were still at toxic levels, the toxic zone in the subterranean site adjacent to the injector well will have become non-toxic to microorganisms. Thus, the microbial inoculum may pass through the subterranean site adjacent to the water injection well without encountering toxic levels of the amines.

In another embodiment, hydrogen peroxide may be added to the toxic zone, as both a degradation and a dispersing agent, from about 1,000 parts per million to 70,000 parts per million by volume of water. In another embodiment, perchlorates may be added, as both a degradation and a dispersing agent, from about 1 parts per million to about 10,000 parts per million.

In another embodiment, any acid capable of lowering the pH at least 1 unit less than the equivalence point of the amine (as measured in the Examples below) may be used. The acid used to ionize the amines may include, but is not limited to, nitric acid, acetic acid, oxalic acid, hydrofluoric acid, and hydrochloric acid. Acid may be added from about 0.1 weight % to about 20 weight % to the water that is being pumped into the toxic zone.

In a MEOR process, viable microorganisms are added to the water being injected into the water injection well. The term "inoculum of microorganisms" refers to the concentration of viable microorganisms added. These microorganisms colonize, that is to grow and propagate, at the subterranean sites adjacent to the water injection well to perform their MEOR.

Microorganisms useful for this application may comprise classes of facultative aerobes, obligate anaerobes and denitrifiers. The inoculum may comprise of only one particular species or may comprise two or more species of the same genera or a combination of different genera of microorganisms.

The inoculum may be produced under aerobic or anaerobic conditions depending on the particular microorganism(s) used. Techniques and various suitable growth media for growth and maintenance of aerobic and anaerobic cultures are well known in the art and have been described in "Manual of Industrial Microbiology and Biotechnology" (A. L. Demain and N. A. Solomon, ASM Press, Washington, D.C., 1986) and "Isolation of Biotechnological Organisms from Nature", (Labeda, D. P. ed. p 117-140, McGraw-Hill Publishers, 1990).

Examples of microorganisms useful in MEOR in this application include, but are not limited to: *Comamonas terrigena, Fusibacter paucivorans, Marinobacterium georgiense, Petrotoga miotherma, Shewanella putrefaciens, Pseudomonas stutzeri, Vibrio alginolyticus, Thauera aromatics, Thauera chlorobenzoica* and *Microbulbifer hydrolyticus*.

In one embodiment an inoculum of *Shewanella putrefaciens* (ATCC PTA-8822) may be used to inoculate the slim tube test. In another embodiment *Pseudomonas stutzeri* (ATCC PTA8823) may be used to inoculate the slim tube. In another embodiment *Thauera aromatica* (ATCC9497) may be used to inoculate the slim tube.

The inoculum of microorganisms useful for bioremediation may comprise, but are not limited to, various species of: *Corynebacteria, Pseudomonas, Achromobacter, Acinetobacter, Arthrobacter, Bacillus, Nocardia, Vibrio*, etc. Additional useful microorganisms for bioremediation are known and have been cited, for example, in Table 1 of U.S. Pat. No. 5,756,304, columns 30 and 31.

The inoculum for injecting into the water well injection site may comprise one or more of the microorganisms listed above.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and make various changes and modifications to the invention to adapt it to various uses and conditions.

General Methods

Chemicals and Materials

All reagents, and materials used for the growth and maintenance of microbial cells were obtained from Aldrich Chemicals (Milwaukee, Wis.), DIFCO Laboratories (Detroit, Mich.), GIBCO/BRL (Gaithersburg, Md.), or Sigma Chemical Company (St. Louis, Mo.), unless otherwise specified.

Amines Analysis

Concentration of amines, in media and water, were analyzed by gas chromatography (GC). An Agilent Model 5890 (Agilent, Wilmington, Del.), GC equipped with a flame photoionization detector and a split/splitless injector, a DB-FFAP column (30 meter length×0.32 millimeter (mm) depth×0.25 micrometer particle size). The equipment had an Agilent ALS Autoinjector, 6890 Model Series with a 10 milliliter (ml) syringe. The system was calibrated using a sample of N,N-Dimethyl-1-Dodecaneamine (Aldrich). Helium was used as the carrier gas. A temperature gradient of 50 degrees Celsius (° C.) to 250° C. at 30° C. increase per minute (min) was used. Retention times (in minutes, min) for various chemicals of interest included: N,N-Dimethyl-1-Dodecaneamine (8.08 min); N,N-Dimethyl-1-Tetradecaneamine (8.85 min); N,N-Dimethyl-1-Hexadecane-amine (9.90 min); N,N-Dimethyl-1-Octadecaneamine (10.26 min) and N-Methyl,N-Benzyll-1-Tetradecaneamine (11.40 min).

Example 1

Figure 2:
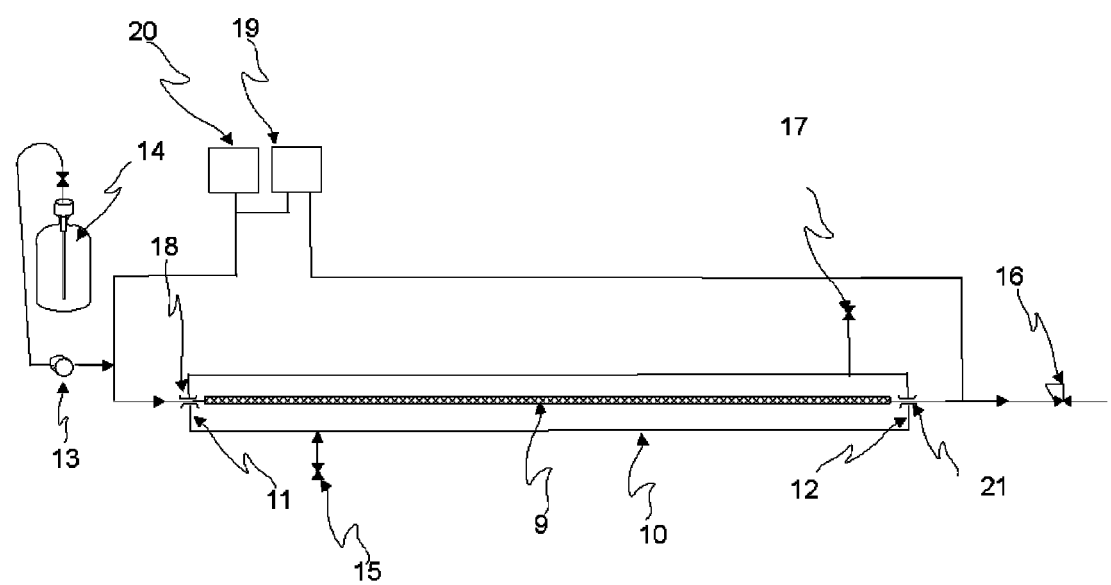
FIG. 2 is the schematic of a model system used to simulate formation of a toxic zone. (9) is a long slim tube; (10) is a pressure vessel to constrain the slim tube; (11 and 12) are the opposite ends of the pressurized vessel; (13) is a pump; (14) is the feed reservoir; (15) is the water inlet for the pressure vessel; (16) is the back pressure regulator; (17) is the high pressure air supply; (18) is an inlet fitting connecting the slim tube inside the pressure vessel to the pump and pressure transducers; (21) is an outlet fitting connecting the slim tube inside the pressure vessel to the back pressure regulator and the low side of the differential pressure transducer; (19) is a differential pressure transducer; and (20) is an absolute pressure transducer.

Establishing a Toxic Zone in Core Sand from an Oil Well Using a Mixture of Amines in a Model System A sample of the sand obtained from the Schrader Bluff formation at the Milne Point Unit of the Alaska North Slope was cleaned by washing with a solvent made up of a 50/50 (volume/volume) mixture of methanol and toluene. The solvent was subsequently drained and then evaporated off the core sand to produce clean, dry, flow able core sand. This core sand was sieved to remove particles with less than one micrometer in size and was then packed tightly into a four foot (121.92 cm) long flexible slim tube (9) and compacted by vibration using a laboratory engraver. Both ends of the slim tubes were capped to keep the core sand in it. The complete apparatus is shown in FIG. 2. Tubing that can sustain the amount of pressures used in the slim tube, was connected to the end caps. The slim tube (9) was mounted into the pressure vessel (10) with tubing passing through the ends (11 and 12) of the pressure vessel using pressure fittings (18 and 21). Additional fittings and tubing were used to connect the inlet of the slim tube (11) to a pressure pump (13) and a feed reservoir (14).

Additional fittings and tubing connected the inlet of the slim tube to an absolute pressure transducer (20) and the high pressure side of a differential pressure transducer (19). Fittings and tubing connected the outlet of the slim tube (12) to the low pressure side of a differential pressure transducer (19) and to a back pressure regulator (16). The signals from the differential pressure and the absolute pressure transducer were ported to a computer and the pressure readings were monitored and periodically recorded. The pressure vessel (10) around the slim tube was filled with water through a water port (15). This water was then slowly pressurized with air (17) to a pressure of about 105 per square inch (psi) (0.72 mega Pascal) while brine #1 from the feed reservoir (14) (Table 1) flowed through the slim tube and left the slim tube through the back pressure regulator (16). This operation was performed such that the pressure in the slim tube was always 5 to 20 psi (0.034-0.137 mega Pascal) below the pressure in the pressure vessel (10).

TABLE 1

Ingredients of Brine #1
(no nutrient brine - gram per liter (gr/L) of tap water

| | |
|---|---|
| NaHCO$_3$ | 1.38 grams (gr) |
| CaCl$_2$*6H$_2$O | 0.39 gr |
| MgCl$_2$*6H$_2$O | 0.220 gr |
| KCl | 0.090 gr |
| NaCl | 11.60 gr |
| NaHCO$_3$ | 1.38 gr |
| Trace metals | 1 ml |
| Trace vitamins | 1 ml |
| Na$_3$(PO$_4$) | 0.017 gr (=10 parts per million (ppm) PO$_4$) |
| NH4Cl | 0.029 gr (=10 ppm NH$_4$) |
| Acetate | 0.2 gr (200 ppm acetate) |

The pH of brine #1 was adjusted to 7.0 with either HCl or NaOH and the solution was filter sterilized.

TABLE 2

Concentration of the amines added to Brine #1

| Sample | Minor amine PPM | other amine PPM | NN-Dimethyl-1-Dodeca-neamine PPM | NN-Dimethyl-1-tetradeca-neamine PPM | NN-Dimethyl-Methane-thioamide ?? PPM | Caprolactam PPM | N-methylN-Benzyl-1-tetradeca-neamine PPM |
|---|---|---|---|---|---|---|---|
| Brine #1 w/amine | 25 | 124 | 23 | 1 | 0 | 0 | 2 |

Once the pressure inside and outside the slim tube was established, one pore volume of the crude oil from an oil reservoir of the Milne Point Unit of the Alaskan North Slope was pumped into the slim tube. This process was performed in several hours (h). Once the crude oil had saturated the core sand in the slim tube and was observed in the effluent, the flow was stopped and the oil was allowed to age in the core sand for 3 weeks. At the end of this time, brine #1 was pumped through the slim tube at a rate of ~1.5-3.5 milliliter per hour (ml/h) (~1 pore volume every 20 h). Samples were taken from the effluent and the concentration of natural microflora in them was determined.

After 51 pore volumes of flow through the slim tube the concentration of natural microflora in the system was about $1 \times 10^7$ colony forming units per milliliter (CFU/ml). At this point, a mixture of amines (hereafter amines/brine mixture) was added at 150 ppm concentration to brine #1. The approximate composition of the mixture of amines (Table 2) consisted of 7 different amine components that were identified. Five were identified by Mass Spectrometry (Agilent Technologies, Inc. Santa Clara, Calif.) as N-N-dimethyl-1-dodecaneamine, N-N-dimethyl-1-tetradecane-amine, N-N-dimethyl-methane-thioamide, caprolactam and N-methyl-N-benzyl-1-tetradecaneamine. Two of the components were identified as amines but specific chemical formulas could not be assigned to them because the Mass Spectral Fragmentation patterns could not be deciphered. These are labeled in Table 2 as "minor amine" and "other amine". Analysis of the effluent from the slim tube did not indicate presence of any amines in it. The experiment was continued by pumping 150 ppm of the mixture of amines in brine #1 through the slim tube.

After 77 pore volumes of the mixture of brine #1 with 150 ppm of mixture of amines was pumped into the slim tube no amines were observed in the effluent.

After 80 pore volumes of the mixture of brine #1 with 150 ppm of mixture of amines was pumped into the slim tube a total of about 1 gr of the mixture of amines had flowed through the slim tube. At this point, 80 ppm of amines was finally observed in the effluent of the slim tube. This very long delay in seeing the amines in the effluent means that virtually all the amines had been trapped in the slim tube. In addition, at this time, no natural microflora could be seen in the effluent indicating that the slim tube had become toxic enough to kill all existing microflora. At this point, pumping the amines-free brine #1 was started in an attempt to flush the amines out of the slim tube and to make it less toxic.

After 24 pore volumes of the amines-free brine #1 had been pumped through the slim tube, 51 ppm of amines was detected in the effluent. The slim tube was then inoculated with one pore volume of *Shewanella putrefaciens* (ATCC PTA-8822) at a concentration of approximately $1 \times 10^9$ CFU/ml. This inoculation was not allowed to remain in the slim tube. Instead, amines-free brine #1 was flushed through the slim tube immediately after the inoculation. Consequently the microbes resided in the slim tube for only a few hours during the transit through it. Thus, it was anticipated that the microorganisms' concentration in the effluent could be measured in the effluent eluting the slim tube. However, remarkably no microorganisms (representing about a 9 log kill) were detected in the slim tube effluent despite the short residence time of the inoculum in the slim tube. This experiment confirmed that a toxic zone had been established in the slim tube. In a continued attempt to detoxify the slim tube, brine #1 alone was continuously pumped through it.

After 79 pore volumes of the amines-free brine #1 had been pumped through the slim tube, the amines concentration in the effluent of the slim tube was measured at 30 ppm. The slim tube was inoculated with another pore volume of *Shewanella putrefaciens* (at $1 \times 10^9$ CFU/ml). The CFU/ml in an effluent sample was about $1 \times 10^4$ showing more than a 5 log kill of this microorganism had occurred immediately following inoculation. This experiment underlined the continued toxic effect of the amines despite extended washing of the tube with the amines-free brine #1 solution.

After 108 pore volumes of the amines-free brine #1 had been pumped through the slim tube, the amine concentration in the effluent was measured at 5 ppm. The slim tube was inoculated with an additional one pore volume of *Shewanella putrefaciens* containing $1 \times 10^9$ CFU/ml. The CFU/ml in the effluent sample of the slim tube immediately following inoculation indicated a 4-5 log kill of this microorganism despite the extended washing with the amines-free brine #1 and the decrease in the amines concentration in the effluent. These results further confirmed the continued toxic effect of the mixture of amines accumulated in the slim tube.

After 143 pore volumes of the amines-free brine #1 had been pumped through the slim tube one pore volume of an inexpensive odorless mineral spirits (OMS)(Parks OMS, Zinsser Co., Inc., Somerset Jew Jersey #2035 CAS #8052-41-3) was pumped through the slim tube in an attempt to remove the remaining mixture of amines. After this flush of OMS, pumping of amines-free brine #1 through the slim tube was continued.

After 149 pore volumes of amines-free brine #1 had been pumped through the slim tube, the amines concentration in the effluent was measured at 4 ppm and the slim tube was inoculated with an additional one pore volume of *Shewanella putrefaciens* ($1 \times 10^9$ CFU/ml). A count of microorganisms in the sample of the slim tube's effluent showed a 2-3 log kill (99 to 99.9%) despite the OMS flush and the extended washing with the amines-free brine #1. These results confirmed that the toxic zone in the slim tube was still killing virtually all the microorganisms added to the tube.

After 168 pore volumes of the amines-free brine #1 had been pumped through the slim tube, one pore volume of a solution of 10% HCl in water was pumped through the slim tube to remove the amines. After this acid wash, the amines-free brine #1 was continuously pumped through the slim tube.

Following the acid wash treatment, an additional 2 pore volumes of the amines-free brine #1 was pumped through the slim tube and the amines concentration in the effluent was measured at 0.5 ppm. The slim tube was then inoculated with an additional one pore volume of *Shewanella putrefaciens* ($1 \times 10^9$ CFU/ml). The CFU/ml in the effluent showed about a 0.4 log kill of this microorganism. These results underlined survival of more microorganisms following the acid wash of the slim tube and the effectiveness of using an acid to detoxify the toxic zone in the slim tube. Table 3 below summarizes results of the various tests described above.

TABLE 3

Summary of the amount of amine observed in the slim tube's effluent and the fraction of the microorganisms killed (log kill) during residence in the slim tube.

| Total Pore volume of fluid pumped through slim tube | ppm amines in the effluent | log kill after inoculating | |
|---|---|---|---|
| 51 | 0 | 0 | |
| 131 | 80.5 | nd | amines flood stopped |
| 155 | 51.1 | 9.6 | |
| 210 | 29.5 | 5.3 | (at least) |
| 239 | 4.7 | 4.5 | (at least) |
| 274 | OMS flooded ~1 pore volume | | |
| 280 | 4.2 | 2.4 | |
| 299 | 10% HCL flooded for 1 PV | | |
| 301 | 0.5 | 0.4 | |

PV = pore volume;
nd = not detected

Example 2

Figure 3:
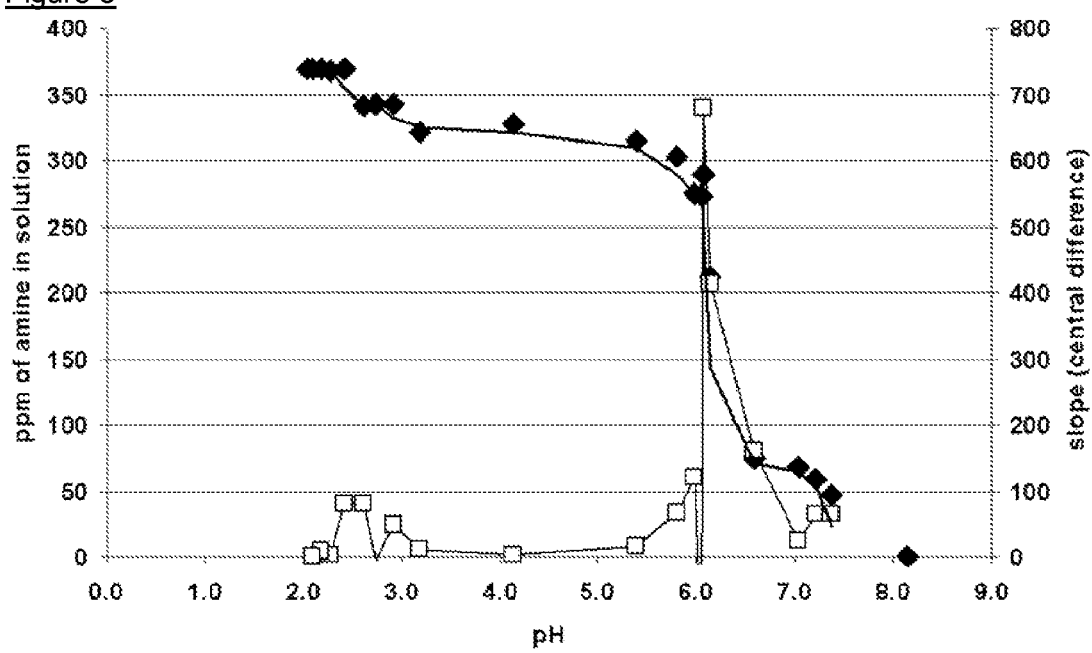
FIG. 3 depicts titration of amine coated core sand; ♦ represent amine coated sand and ☐ represent first derivative of the titration curve (central differences).

Removal of N N-Dimethyl-1-Dodecanamine from Core Sand Through their Ionization at Low pH Using Hydrochloric Acid 38 milligrams (mg) of N N-Dimethyl-1-Dodecanamine (hereafter referred to as "the amine") was added to 10.210 gr of Pentane. This solution was added to 10.1845 gr of specific sand layers (Oa and Ob) obtained from the Schrader Bluff formation of the Milne Point Unit of the Alaskan North slope. The oil content of the sand was first removed using a mixture of methanol and toluene (50/50, volume/volume) as solvent washes. The solvent mixture was subsequently evaporated off the core sand to produce clean, dry, flowable core sand. This sand was mixed with the amine and pentane solution to produce a slurry. This slurry was thoroughly mixed and the pentane was evaporated off leaving the amine on the sand (hereafter referred to as sand/amine mixture). 100 ml of brine #2 (Table 3) was added to the sand/amine mixture to create the sand/amine/brine mixture. The initial pH of the sand/amine/brine mixture was 8.4. The concentration of the amine in the water should have been 380 ppm if all the amine were dissolved in brine #2. Analysis of a sample of sand/amine/brine mixture by GC did not reveal the presence of any amines in the test sample (i.e., the amine conc. was ~<1 ppm). The fact that the amine was not detected underlined its strong binding to the sand particles. 0.1 ml of 1 normal (N) HCl was added to this solution, and the pH and the amine concentration was measured again. This step was repeated several times and the analyses results are shown in both Table 4 and in FIG. 3. Complete ionization and solubilization of the amine in the water was observed at pH below ~6.0. This is a surprising finding since the pKa of HCl is −6.2 (Langes Handbook of Chemistry, 14$^{th}$ edition, page 8.14, 1992, McGraw-Hill, Inc., New York). Therefore, the concentration of the HCl required for this step to completely ionize the amine and removed it from the toxic core sand may be further reduced several orders of magnitude from the 10% concentration used in this example. The data underlines the remarkable efficiency of an acid at ionizing and removing the amine from the sand.

TABLE 3

Composition of brine #2 (gr/L of deionized water)

| | |
|---|---|
| NaHCO$_3$ | 1.38 gr |
| CaCl$_2$*6H$_2$O | 0.39 gr |
| MgCl$_2$*6H$_2$O | 0.220 gr |
| KCl | 0.090 gr |
| NaCl | 11.60 gr |

TABLE 4

Amine concentration measured in Example 2

| sample | N-N-dimethyl-1-dodeanamine (ppm) in slim tube effluent | First derivative (change in amine/change in pH) | pH | 1N HCl (ml) |
|---|---|---|---|---|
| Amine titrate st | 0.00 | | 8.14 | 0.00 |
| Amine titrate 1 | 46.41 | 63.75 | 7.37 | 0.10 |
| Amine titrate 2 | 59.29 | 63.42 | 7.21 | 0.10 |
| Amine titrate 3 | 67.97 | 24.34 | 7.03 | 0.10 |
| Amine titrate 4 | 74.38 | 160.35 | 6.59 | 0.10 |
| Amine titrate 5 | 212.28 | 412.18 | 6.13 | 0.10 |
| Amine titrate 6 | 288.72 | 679.86 | 6.07 | 0.10 |
| Amine titrate 7 | 273.47 | −148.78 | 6.04 | 0.05 |
| Amine titrate 8 | 275.33 | 119.35 | 5.98 | 0.05 |
| Amine titrate 9 | 303.31 | 65.90 | 5.79 | 0.05 |
| Amine titrate 10 | 314.21 | 15.17 | 5.39 | 0.05 |
| Amine titrate 11 | 328.48 | 3.24 | 4.13 | 0.05 |
| Amine titrate 12 | 321.33 | 11.80 | 3.19 | 0.05 |
| Amine titrate 13 | 342.88 | 47.42 | 2.91 | 0.05 |
| Amine titrate 14 | 342.67 | −6.52 | 2.74 | 0.05 |
| Amine titrate 15 | 340.92 | 79.86 | 2.61 | 0.05 |
| Amine titrate 16 | 369.02 | 80.22 | 2.41 | 0.10 |
| Amine titrate 17 | 368.19 | 2.25 | 2.27 | 0.10 |
| Amine titrate 18 | 369.54 | 7.51 | 2.18 | 0.10 |
| Amine titrate 19 | 369.47 | 0.12 | 2.10 | 0.10 |
| Amine titrate 20 | 369.56 | | 2.04 | 0.10 |

Example 3

Capacity of Core Sand to Neutralize Acid

A. Titration of Brine #2 in the Absence of Core Sand

The intent of this experiment was to determine the capacity of the core sand described in Example 2 to neutralize the HCl intended to ionize the amine accumulated in the sand.

Figure 4:
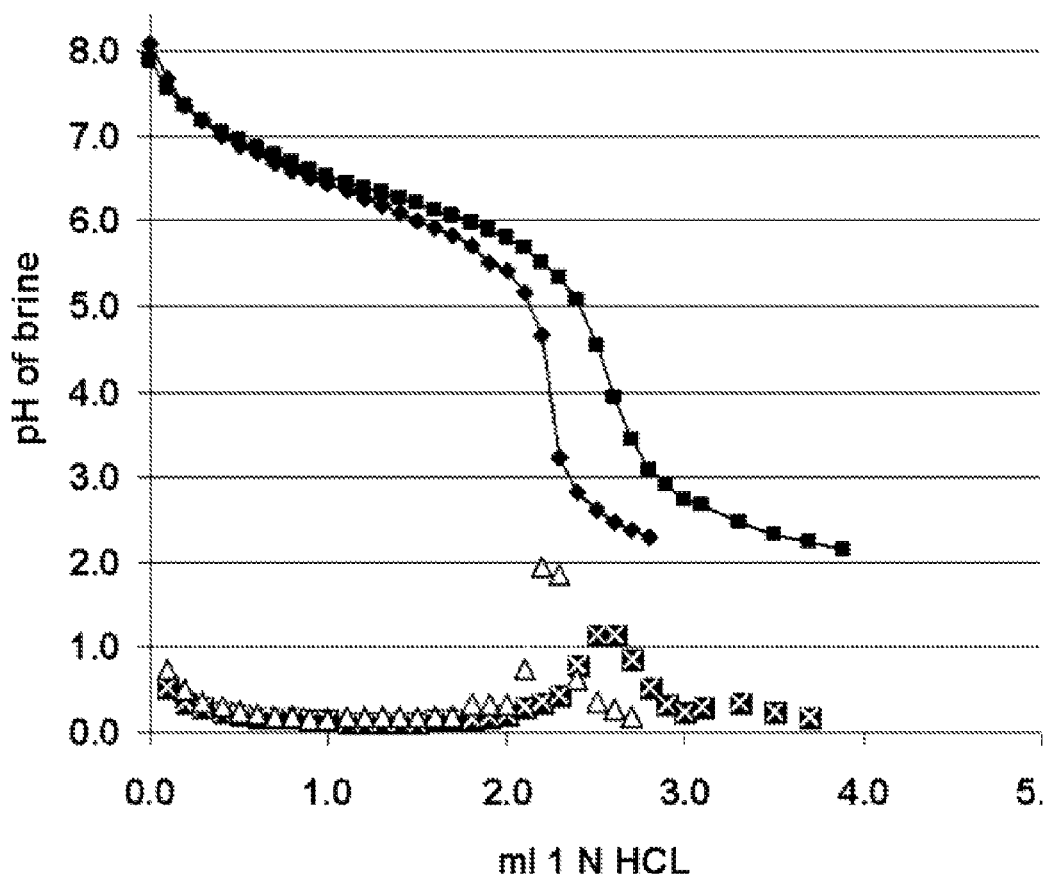
FIG. 4 depicts titration of brine and core sand with 1N HCl; ■ represent brine #1 with 10 grams of core sand; diamonds ♦ represent brine #1 only; ✖ represents the slope of brine #1 with 10 grams of core sand; and Δ represents the slope of brine #1 only.

To set up a control test, 100 ml of brine #2 was titrated with 1N HCl to initial pH of 8.1. An aliquot (0.1 ml) of 1N HCl was added to the brine #2 and the pH was measured. The HCl addition was repeated several times and the pH was measured after each addition. Results of these analyses are shown in both Table 5 and in FIG. 4. The data indicated that about 2.25 milliequivalents of HCl were needed to achieve the equivalence point of about pH 4 corresponding to about 100% recovery of the carbonate present in brine #2.

TABLE 5

Titration of synthetic injection brine #2 in the absence of the amine

| sample | pH | First derivative of pH | 1N HCl (ml) |
|---|---|---|---|
| Addition 1 | 8.10 | | 0.00 |
| Addition 2 | 7.67 | 0.73 | 0.10 |
| Addition 3 | 7.37 | 0.49 | 0.10 |
| Addition 4 | 7.18 | 0.35 | 0.10 |
| Addition 5 | 7.02 | 0.29 | 0.10 |
| Addition 6 | 6.89 | 0.23 | 0.10 |
| Addition 7 | 6.79 | 0.21 | 0.10 |
| Addition 8 | 6.68 | 0.19 | 0.10 |
| Addition 9 | 6.60 | 0.17 | 0.10 |
| Addition 10 | 6.51 | 0.15 | 0.10 |
| Addition 11 | 6.45 | 0.15 | 0.10 |
| Addition 12 | 6.36 | 0.18 | 0.10 |
| Addition 13 | 6.27 | 0.18 | 0.10 |
| Addition 14 | 6.18 | 0.18 | 0.10 |
| Addition 15 | 6.09 | 0.17 | 0.10 |
| Addition 16 | 6.01 | 0.17 | 0.10 |
| Addition 17 | 5.92 | 0.18 | 0.10 |
| Addition 18 | 5.83 | 0.19 | 0.10 |
| Addition 19 | 5.73 | 0.33 | 0.10 |
| Addition 20 | 5.50 | 0.32 | 0.10 |
| Addition 21 | 5.41 | 0.33 | 0.10 |
| Addition 22 | 5.17 | 0.74 | 0.10 |
| Addition 23 | 4.67 | 1.94 | 0.10 |
| Addition 24 | 3.23 | 1.86 | 0.10 |
| Addition 25 | 2.81 | 0.62 | 0.10 |
| Addition 26 | 2.61 | 0.36 | 0.10 |
| Addition 27 | 2.45 | 0.25 | 0.10 |
| Addition 28 | 2.36 | 0.17 | 0.10 |
| Addition 29 | 2.28 | | 0.10 |

B. Titration of Brine #2 with Core Sand 100 ml of brine #2 plus 10 gr of the same core sand (brine/sand mixture) used in Example 2, was titrated with 1N HCl. The initial pH of the brine/sand mixture was 7.88. 0.1 ml aliquots of 1N HCl were added to this mixture repeatedly, and the pH was measured after each HCl addition. The results shown in both Table 6 and in FIG. 4 indicated that addition of 0.3 milliequivalents of HCl was needed to achieve the equivalence point with 10 gr of sand present. The data obtained in this experiment underlines the slight capacity of the core sand to neutralize the added HCl. Consequently a small concentration of an acid, such as HCl, ionized the amine associated with the core sand without getting neutralized by reaction with the sand.

TABLE 6

Titration of brine #2 and 10 gr of core sand

| Sample | Brine contained 1.87 gr NaHCO$_3$ 2.60 ml of 1N HCL at pH | Used 10.103 gr of core sand Slope of pH (first derivative) | ml 1N HCl |
|---|---|---|---|
| 1 | 7.88 | | 0.00 |
| 2 | 7.55 | 0.53 | 0.10 |
| 3 | 7.35 | 0.36 | 0.10 |
| 4 | 7.19 | 0.30 | 0.10 |
| 5 | 7.05 | 0.24 | 0.10 |
| 6 | 6.95 | 0.20 | 0.10 |
| 7 | 6.85 | 0.18 | 0.10 |
| 8 | 6.77 | 0.18 | 0.10 |
| 9 | 6.67 | 0.17 | 0.10 |
| 10 | 6.60 | 0.14 | 0.10 |
| 11 | 6.53 | 0.14 | 0.10 |
| 12 | 6.46 | 0.13 | 0.10 |
| 13 | 6.40 | 0.12 | 0.10 |
| 14 | 6.34 | 0.13 | 0.10 |
| 15 | 6.27 | 0.13 | 0.10 |

TABLE 6-continued

Titration of brine #2 and 10 gr of core sand

| Sample | Brine contained 1.87 gr NaHCO$_3$ 2.60 ml of 1N HCL at pH | Used 10.103 gr of core sand Slope of pH (first derivative) | ml 1N HCl |
|---|---|---|---|
| 16 | 6.21 | 0.13 | 0.10 |
| 17 | 6.14 | 0.15 | 0.10 |
| 18 | 6.06 | 0.16 | 0.10 |
| 19 | 5.98 | 0.16 | 0.10 |
| 20 | 5.90 | 0.17 | 0.10 |
| 21 | 5.81 | 0.21 | 0.10 |
| 22 | 5.69 | 0.29 | 0.10 |
| 23 | 5.52 | 0.34 | 0.10 |
| 24 | 5.35 | 0.45 | 0.10 |
| 25 | 5.07 | 0.80 | 0.10 |
| 26 | 4.55 | 1.14 | 0.10 |
| 27 | 3.93 | 1.13 | 0.10 |
| 28 | 3.42 | 0.86 | 0.10 |
| 29 | 3.07 | 0.52 | 0.10 |
| 30 | 2.90 | 0.33 | 0.10 |
| 31 | 2.74 | 0.24 | 0.10 |
| 32 | 2.66 | 0.29 | 0.10 |
| 33 | 2.45 | 0.34 | 0.20 |
| 34 | 2.32 | 0.23 | 0.20 |
| 35 | 2.22 | 0.18 | 0.20 |
| 36 | 2.14 | | 0.20 |

Example 4

Figure 5:
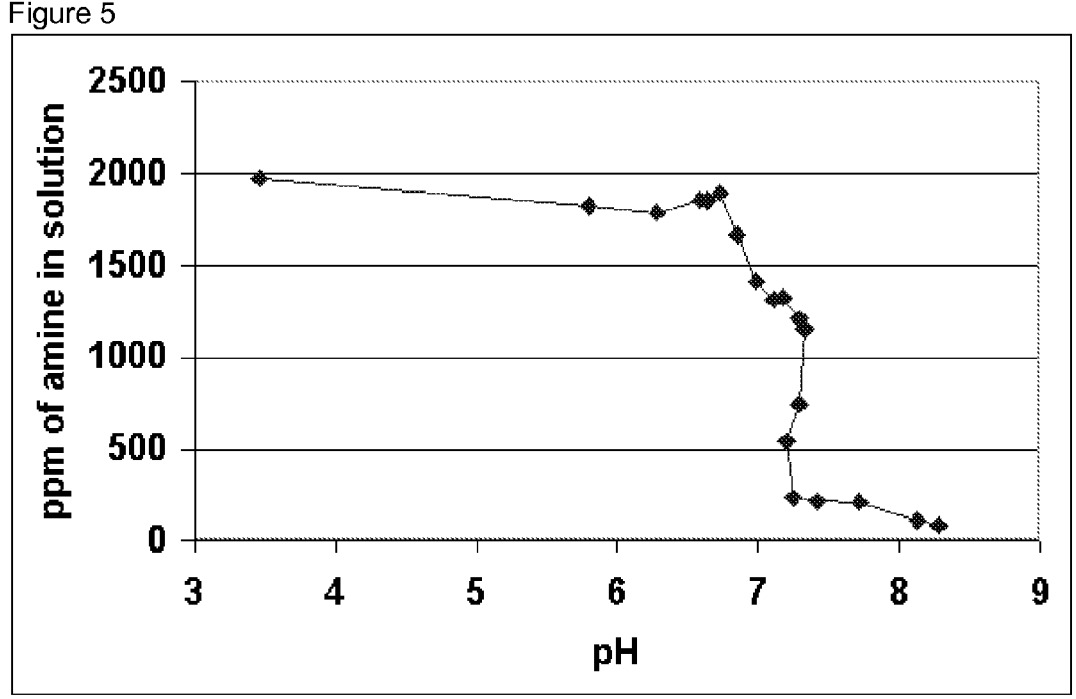
FIG. 5 depicts titration of brine and core sand with 10% nitric acid; ♦ represent the concentration of amine observed in solution for a given pH.

Removal of N-N-Dimethyl-1-Dodecanamine from Core Sand Through their Ionization at Low pH Using 10% Nitric Acid The procedure outlined in Example 2 was used to produce the sand/amine mixture except that 519 mg of the amine, 10 gr of Pentane. and 60.062 gr of sand from the Oa and Ob layers were used. 29.065 gr of this sand/amine mixture was added to 100 ml of brine #2 (Table 3) to create the sand/amine/brine mixture. The initial pH of the sand/amine/brine mixture was 8.28. The concentration of the amine in the water should have been about 2000 ppm if all the amine was dissolved in brine #2. Instead, analysis of a sample of brine #2 in contact with the sand/amine/brine mixture as described above showed that the amine concentration was ~85 ppm, i.e., far less than what was expected. The fact that only a small amount of the amine was detected in brine #2 underlined the strong binding of the amine to the sand particles. 0.1 ml of 10 weight percent (wt %) nitric acid in water was added to this solution, and the pH and the amine concentration were measured again. This step was repeated several times and the analyses results are shown in both Table 7 and in FIG. 5. Complete ionization and solubilization in the water of the amine was observed at a pH below ~6.7. This is a surprising finding since the pKa of nitric acid is −1.37 (Langes Handbook of Chemistry, 14$^{th}$ edition, page 8.15, 1992, McGraw-Hill, Inc., New York), the concentration of the nitric acid required for this step may be further reduced several orders of magnitude from the 10 wt % used in this experiment without any negative impact on removal of the amines from the core sand.

TABLE 7

Amine concentration measured in Example 4

| sample | ppm N-N-dimethyl-1-dodeanamine | pH | ml 10% HNO$_3$ |
|---|---|---|---|
| start | 85 | 8.28 | 0 |
| 1 | 110 | 8.13 | 0.1 |
| 2 | 211 | 7.72 | 0.1 |
| 3 | 216 | 7.42 | 0.1 |
| 4 | 235 | 7.25 | 0.1 |
| 5 | 540 | 7.2 | 0.1 |
| 6 | 745 | 7.29 | 0.1 |
| 7 | 1153 | 7.33 | 0.1 |
| 8 | 1210 | 7.29 | 0.1 |
| 9 | 1327 | 7.18 | 0.1 |
| 10 | 1315 | 7.11 | 0.1 |
| 11 | 1413 | 6.99 | 0.1 |
| 12 | 1667 | 6.85 | 0.1 |
| 13 | 1897 | 6.73 | 0.1 |
| 14 | 1853 | 6.64 | 0.1 |
| 15 | 1858 | 6.59 | 0.1 |
| 16 | 1788 | 6.28 | 0.2 |
| 17 | 1822 | 5.8 | 0.2 |
| 18 | 1975 | 3.46 | 0.2 |

Example 5

Figure 6:
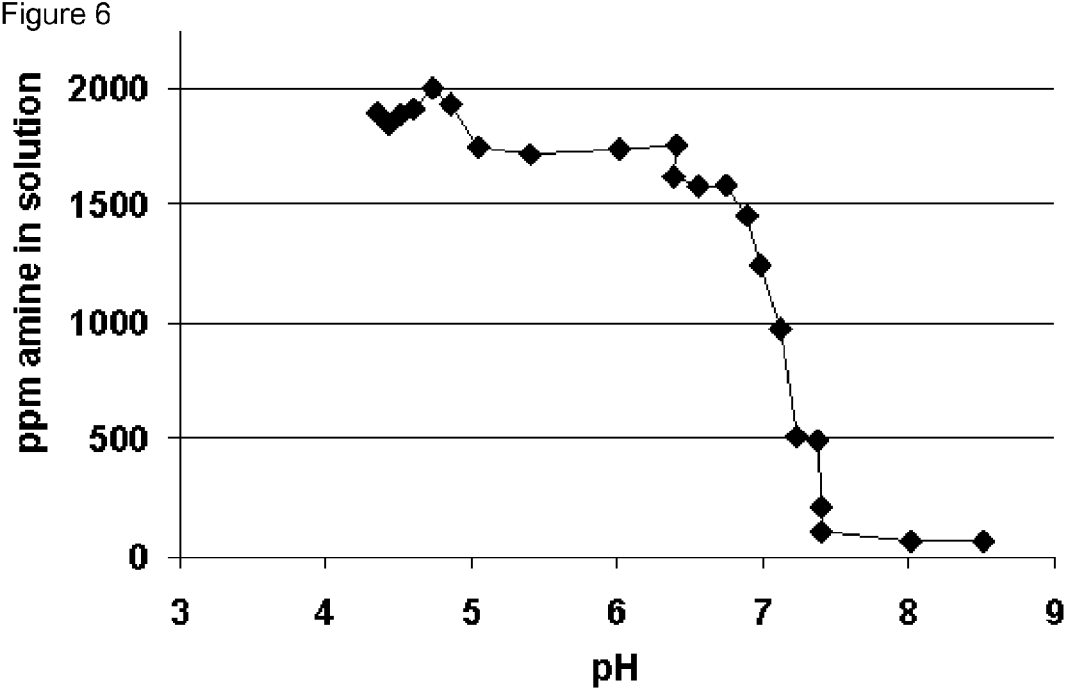
FIG. 6 depicts titration of brine and core sand with 10% acetic acid; ♦ represent the concentration of amine observed in solution for a given pH.

Removal of N-N-Dimethyl-1-Dodecanamine from Core Sand Through its Ionization at Low pH Using 10% Acetic Acid The same procedure outlined in Example 4 was repeated here to produce the sand/amine mixture. 30.85 grams (gr) of the sand/amine mixture was added to 100 ml of brine #2 (Table 3) to create the sand/amine/brine mixture. The initial pH of the sand/amine/brine mixture was 8.52. The concentration of the amine in the water should have been about 2000 ppm if all the amine were dissolved in brine #2. Instead, analysis of brine #2 in contact with the sand/amine/brine mixture, as described above, showed that the amine concentration was ~67 ppm, i.e., far less than what was expected. The fact that only a small amount of the amine was detected in the brine #2 underlined the strong binding of the amine to the sand particles. 0.1 ml of 10 wt % acetic acid was added to this solution, and the pH and the amine concentration were measured again. This step was repeated several times and the analyses results are shown in both Table 8 and in FIG. 6. Complete ionization and solubilization in the water of the amine was observed at pH below ~6.7. This is a surprising finding since the pKa of acetic acid is 4.756 (Langes Handbook of Chemistry, 14$^{th}$ edition, page 8.19, 1992, McGraw-Hill, Inc., New York). Consequently, the concentration of the acetic acid required for this step may be further reduced significantly from what was used in this example without any negative impact on removal of the amine from the core sand.

The observations described above illustrate that a weak organic acid, like acetic acid can be as effective as a strong inorganic acid, like hydrochloric acid, at ionizing and separating the amines from the toxic core sand. It can therefore be concluded that to remove the toxic zone from a subterranean site, any acid that decreases the pH of a solution below about 6.7 can be used.

TABLE 8

Amine concentration measured in Example

| sample | ppm N-N-dimethyl-1-dodeanamine | pH | ml 10% acetic acid |
| --- | --- | --- | --- |
| start | 67 | 8.52 | 0 |
| 1 | 63 | 8.01 | 0.1 |
| 2 | 107 | 7.41 | 0.1 |
| 3 | 215 | 7.4 | 0.1 |
| 4 | 497 | 7.37 | 0.1 |
| 5 | 512 | 7.23 | 0.1 |
| 6 | 969 | 7.12 | 0.1 |
| 7 | 1239 | 6.98 | 0.1 |
| 8 | 1453 | 6.89 | 0.1 |
| 9 | 1583 | 6.75 | 0.1 |
| 10 | 1579 | 6.56 | 0.1 |
| 11 | 1616 | 6.39 | 0.1 |
| 12 | 1759 | 6.4 | 0.1 |
| 13 | 1736 | 6.02 | 0.2 |
| 14 | 1718 | 5.4 | 0.2 |
| 15 | 1743 | 5.04 | 0.2 |
| 16 | 1931 | 4.86 | 0.2 |
| 17 | 1995 | 4.73 | 0.2 |
| 18 | 1913 | 4.61 | 0.2 |
| 19 | 1881 | 4.52 | 0.2 |
| 20 | 1837 | 4.43 | 0.2 |
| 21 | 1885 | 4.36 | 0.3 |

What is claimed is:

1. An oil recovery method comprising the steps of:
   a) treating a subterranean site in a zone adjacent to a water injection well with a detoxifying agent wherein, prior to the treatment, corrosion inhibitors and their degradation products have been absorbed into the zone and have accumulated to concentrations that are toxic to microorganisms used in microbial enhanced oil recovery and bioremediation processes, and thereby have formed a toxic zone, wherein the detoxifying agent is also a dispersing agent selected from the group consisting of hydrochloric acid, nitric acid, hydrofluoric acid, acetic acid and oxalic acid; and
   b) adding an inoculum of microorganisms for microbial enhanced oil recovery to the water injection well wherein the inoculum of microorganisms comprises *Shewanella putrefaciens* (ATCC PTA-8822);
   wherein the corrosion inhibitor is an inorganic compound selected from the group consisting of chlorine, hypochlorite, bromine, hypobromide, chlorine dioxide, hydrazine, anthraquinone, phosphates, and salts containing chrome, molybdenum, zinc, nitrates, nitrites and sodium sulfite.

2. The method of claim 1 wherein the dispersing agent causes dissociation of the corrosion inhibitor from the subterranean site adjacent to the water injection well and disperses and dilutes it such that the corrosion inhibitor becomes non-toxic to the microorganisms and the subterranean site adjacent to the water injection well is detoxified.

3. The method of claim 2 wherein the microorganisms colonize the detoxified subterranean site adjacent to the water injection well to perform microbial enhanced oil recovery.

4. The method of claim 1 wherein the dispersing agent is hydrochloric acid.

5. The method of claim 1 wherein the dispersing agent is nitric acid.

6. The method of claim 1 wherein the acid is at a concentration from about 0.1 weight percent to about 20 weight percent.

7. The method of claim 1 wherein the corrosion inhibitor is a growth inhibitor of sulfate reducing bacteria.

* * * * *